April 8, 1941.     H. NERWIN     2,237,887
PHOTOGRAPHIC CAMERA
Filed Feb. 3, 1939     10 Sheets-Sheet 1

Inventor:
Hubert Nerwin
By B. Singer & F. Stern
Atty.

April 8, 1941.   H. NERWIN   2,237,887
PHOTOGRAPHIC CAMERA
Filed Feb. 3, 1939   10 Sheets-Sheet 4

Inventor:
Hubert Nerwin
BY B. Singer & F. Stern
Atty

April 8, 1941.     H. NERWIN     2,237,887
PHOTOGRAPHIC CAMERA
Filed Feb. 3, 1939     10 Sheets-Sheet 5

Inventor:
Hubert Nerwin
BY B. Singer & F. Stern
Atty:

April 8, 1941. H. NERWIN 2,237,887
PHOTOGRAPHIC CAMERA
Filed Feb. 3, 1939 10 Sheets-Sheet 7

Inventor:
Hubert Nerwin
BY: B. Singer & F. Stern
Atty.

April 8, 1941.  H. NERWIN  2,237,887
PHOTOGRAPHIC CAMERA
Filed Feb. 3, 1939  10 Sheets-Sheet 8

Inventor:
Hubert Nerwin
BY: B. Singer & F. Stern
Atty.

April 8, 1941.   H. NERWIN   2,237,887

PHOTOGRAPHIC CAMERA

Filed Feb. 3, 1939   10 Sheets-Sheet 9

Inventor
Hubert Nerwin
BY B. Singer & F. Stern
Atty.

Inventor
Hubert Nerwin
By:
B. Singer & F. Stern
Atty.

Patented Apr. 8, 1941

2,237,887

UNITED STATES PATENT OFFICE 2,237,887

PHOTOGRAPHIC CAMERA

Hubert Nerwin, Dresden, Germany, assignor to Zeiss Ikon Aktiengesellschaft, Dresden, Germany Application February 3, 1939, Serial No. 254,388
In Germany February 5, 1938

11 Claims. (Cl. 95—32)

The invention relates to improvements in photographic cameras and in particular is directed to rollfilm cameras with extensible bellows provided with a shutter release on the camera casing.

The principal object of the invention is to provide a camera of the type referred to with means for preventing a double exposure of the film and an advancement of the film before the same has been exposed. This means, in accordance with the invention, prevents an operation of the film winding device as long as the shutter release on the camera casing has not been operated, and also is effective to prevent a second operation of said shutter release as long as the film winding device has not been operated to move the next unexposed film section of the film to a position in alinement with the photographic lens.

It is another object of the invention to operatively connect the film winding device of a camera of the type referred to with means actuating the shutter tensioning lever, whenever the exposed section of the film is wound upon the take-up spool.

It is also an object of the invention to provide a camera of the type referred to with a manually operable axially slidable shutter release rod, the axis of which preferably is coincident with the axis about which the camera cover is pivotally mounted in the camera casing.

Another object of the invention is to operatively connect the film winding device with the manually slidable shutter release rod, in such a manner, that the latter is adapted to effect an actuation of the means for tensioning the shutter when said film winding device is operated.

Other objects of the invention will be apparent or will be specifically pointed out in the following description forming a part of this specification. The invention is not limited to the embodiments herein described, as various forms and arrangement of parts and different construction of elements may be adopted within the scope of the claims.

Referring to the drawings:

Fig. 3ª is a sectional view along the line III—III in Fig. 1.

Figs. 5ª, 5ᵇ and 5ᶜ are detail sectional views of the shutter operating knob in various positions, substantially along the rectangular line VI—VI in Fig. 5.

Figure 1:
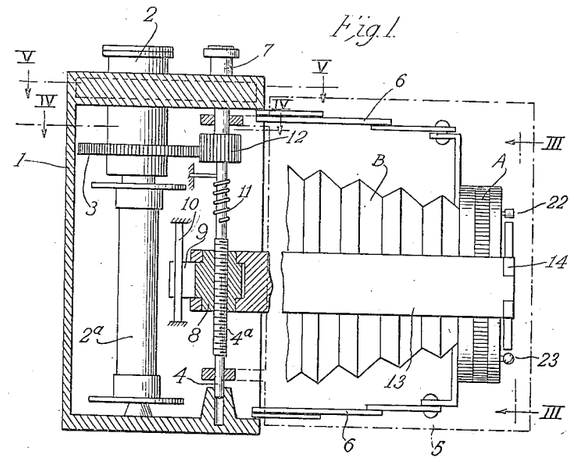
Fig. 1 is a partly diagrammatic sectional view of a rollfilm camera taken in the plane of the pivot axis of the cover and viewed from below.

Referring to Fig. 1 the casing 1 of the rollfilm camera is provided with the customary film winding knob 2, which in the interior of the casing is releasably coupled with a film take-up spool 2ª in any well known manner. In accordance with the invention, a gear 3 is fixedly attached to the stem of the knob 2 within the camera casing 1. The gear 3 meshes with a gear 12 fixedly mounted on a rotatable and axially slidable rod 4, which extends parallel to the axis of the film take-up spool 2ª and forms the pivot axis of the swingable cover 5 of the camera casing 1. A portion 3ª of the circumference of the gear 3 is recessed and when this recessed portion 3ª reaches the gear 12 the driving connection between the gears 3 and 12 is interrupted and the gear 12 returns independently of the gear 3 to its initial position under the action of a torsion spring 11 mounted around the rod 4.

The cover 5, when swung into open position, is maintained in this position by braces 6 as is well known in the art. Preferably, the braces 6 are operatively connected to the camera objective mount A, so that the latter is automatically moved into operative position when the cover 5 is opened, thereby extending the bellows B which connects the objective mount with the camera casing. The rod 4 extends with one of its ends outwardly of the camera casing and this end is provided with a knob 7 which permits a manual operation of the rod by pushing it lengthwise inwardly for the purpose of releasing the previously tensioned shutter in a manner, as will be described presently. The shutter is built into or combined with the camera objective mount A as is customary in cameras of this type and is provided with a tensioning lever 22 and a release lever 23.

The rod 4 is provided between its ends with a thread 4ª which is in engagement with an interiorly threaded sleeve 8. The sleeve 8 is provided with a radial projection 9 in slidable engagement with a guide 10 fixed in the casing and extending parallel to the rod 4, so that the sleeve 8 is prevented from rotating about the axis of the rod 4. The sleeve 8 can move only lengthwise of the rod 4, either simultaneously with the same or without the same when the rod 4 is rotated.

The sleeve 8 supports rotatably a lever arm 13, which extends lengthwise of the cover 5 and has hinged to its forward end a plate 14 adapted to engage alternately the tensioning lever 22 and the release lever 23. The ends of the hinge pin 13ª are mounted in bearings 13ᵇ attached to the cover 5 in any desired suitable manner. A control rod 15 is pivotally connected with one end to the hinged plate 14 and with its other end engages a circumferential guide slot 16 on the sleeve 8. This arrangement has the purpose of tilting the plate 14 upwardly into operative position, when the cover 5 is opened (Fig. 2) and swinging the plate 14 downwardly into inoperative position against the inner face of the cover 5, when the cover 5 is closed (Fig. 3).

Figures 2, 3A, 4, 5, 5A, 5B, 5C:
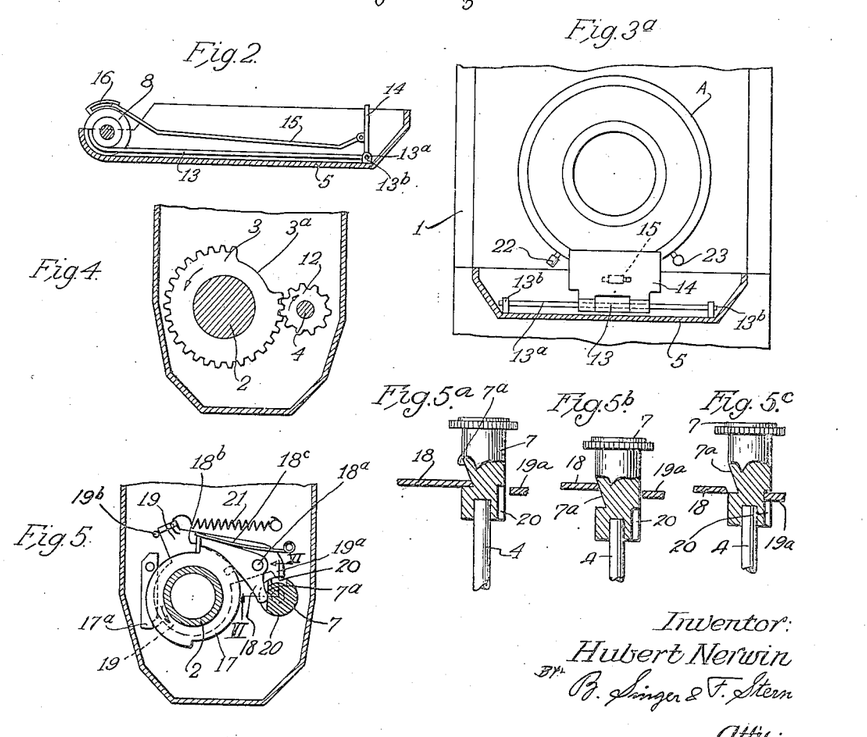
Fig. 2 is a sectional view of the cover of the camera and its associated parts, when in an open position.
Fig. 4 is a sectional view along the line IV—IV of Fig. 1 to illustrate the geared connection between the film winding device and the shutter release device.
Fig. 5 is a sectional view along the line V—V of Fig. 1 to illustrate the alternate locking device between the film winding device and the shutter release device.
Figure 3:
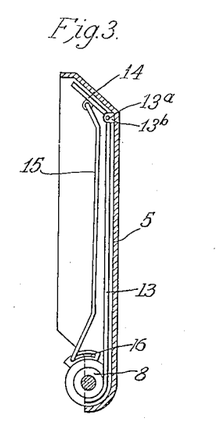
Fig. 3 is a similar view of the cover as in Fig. 2, but in a closed position.

In order to prevent an actuation of the shutter release knob 7 as long as the film winding device has not completed its operation of moving the next unexposed film section in alinement with the photographic objective for exposure, a locking device of a known type, shown in Fig. 5, is provided in the upper portion of the camera casing 1. This locking device is similar to the one described in the French patent specification No. 812,800 and includes a cam disc 17 which is connected fixedly or by a gear transmission to the film winding knob 2 and is prevented against return rotation by a ratchet pawl 17ª or the like. A locking disc 19, which is rotatable about the axis of the cam disc 17 has pivotally attached thereto at 18ª a locking lever 18. One end of the lever 18 has a lateral projection 18ᵇ and is urged by a leaf spring 18ᶜ against the circumference of the cam disc 17. The locking disc 19 is urged by a coil spring 21 in clockwise direction, so that a projection 19ª of said disc 19 tends to enter an axial groove 20 (Fig. 5ª) in the stem of the shutter release knob 7 and enters this groove upon release of the locking lever 18 from the cam disc 17, namely as soon as the shutter has been released once by depressing the knob 7 and the latter has returned to its initial position under the action of the spring 11. A second actuation of the knob 7 is prevented, as shown in Fig. 5ᶜ, by the projection 19ª until the latter is withdrawn from the groove 20 by an advance of the film. The other end of the locking lever 18 engages an inclined face 7ª on the stem of the shutter release knob 7. When the knob 7 is depressed, as illustrated in Fig. 5ᵇ, to release the shutter, the inclined face 7ª causes the locking lever 18 to swing clockwise about its pivot axis 18ª, thereby releasing the other end 18ᵇ of the locking lever 18 from the cam disc 17 and permitting the spring 21 to move the projection 19ª of the locking disc 19 in engagement with the axial groove 20. In this position the locking disc 19 has been moved clockwise away from the stop pin 19ᵇ (Fig. 5) and the end 18ᵇ of the lever 18 rests on the highest point of the cam disc 17. The film winding device is now released and may be actuated to advance the film. When the film winding knob 2 has been rotated almost one-half a complete revolution, the cam disc 17 engages the end 18ᵇ of the locking lever 18 and moves the lever 18 including the locking disc 19 a sufficient distance in counter-clockwise direction to withdraw the projection 19ª from the axial groove 20. In this position, which is illustrated in Figs. 5 and 5ª the locking disc 19 is again in engagement with the stop pin 19ᵇ, which prevents a further advance of the film, and the locking lever 18 prevents a clockwise movement of the locking disc 19 until the release knob is again actuated.

When the film winding knob 2 is rotated, the gear 3 drives the gear 12 and therewith the rod 4 is rotated. Owing to the threaded connection between the rod 4 and the sleeve 8, the latter is moved lengthwise or upwardly (Fig. 1) on the rod 4 and the lever arm 13 on the sleeve engages and actuates with its hinged plate 14 the shutter tensioning lever 22. At the time the lever 22 has been tensioned, the recess 3ª of the gear 3 has reached the gear 12, with the result that the gear 12 including the rod 4, the sleeve 8 and the lever arm 13, 14 return to their initial position, due to the action of the torsion spring 11. When now the shutter release knob 7 is depressed, the sleeve 8 including the lever arm 13 carried by the same, is moved in the opposite direction as during the operation of the film winding device to engage and actuate the shutter release lever 23.

Figure 6:
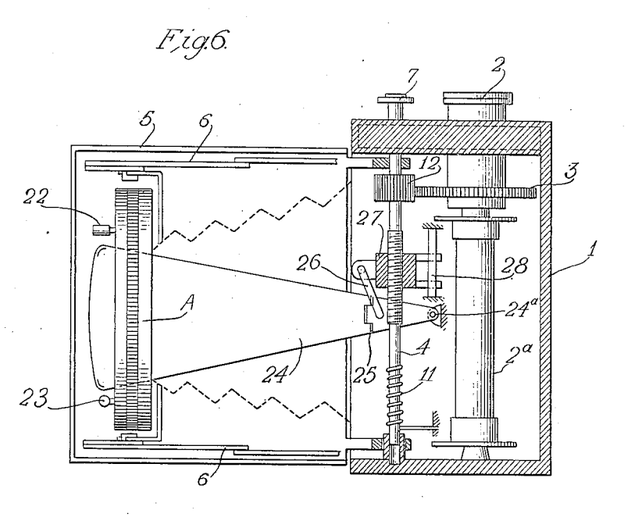
Fig. 6 is a partly diagrammatic sectional view of another embodiment of a rollfilm camera, taken in the plane of the pivot axis of the cover, viewed from above, in which the lever arm controlled by the shutter operating rod is pivotally connected to a fixed point in the camera casing.

Fig. 6 illustrates an embodiment of the invention in which the lever arm 13 of the first described embodiment is substituted by a lever arm 24 whose inner end is pivotally supported at 24ª in the camera casing 1. This lever arm 24 consists of two parts connected with each other by a hinge 25 near the pivot axis of the cover 5. The short part of the lever arm 24 is connected by a link 26 with the interiorly threaded sleeve 27 on the rod 4. The sleeve 27 is prevented in similar manner as in Fig. 1 from rotation by a fixed guide 28 in the casing 1. The actuation of the sleeve 27 takes place in similar manner as described in connection with Fig. 1 by the gearing 3, 12 and the depressible knob 7. When the film winding knob 2 is rotated, the sleeve 27 is moved in a direction in which the link 26 swings the lever arm 24 in engagement with the shutter tensioning lever 22 and actuates the same. A depression of the knob 7 causes the sleeve 27 to move in the opposite direction, so as to effect an actuation of the shutter release lever 23 by the lever arm 24.

A locking device as described with reference to Fig. 5 is arranged between the film winding knob 2 and the shutter release knob 7, in fact, in all modifications hereinafter described the same locking device is employed.

Figure 7:
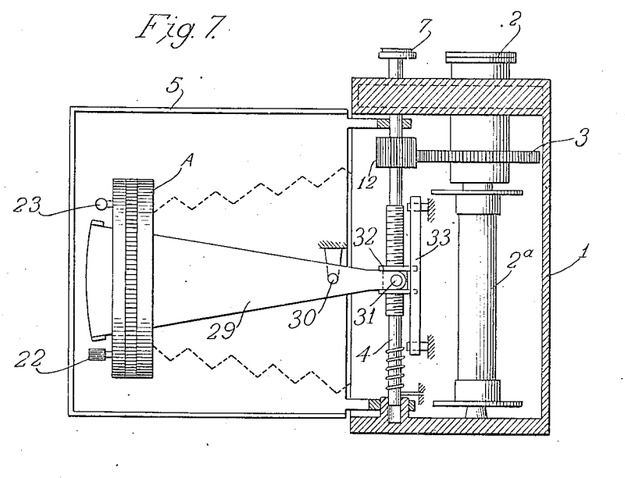
Fig. 7 illustrates in a manner similar to Fig. 6 another modification in which the lever controlled by the shutter operating rod is pivotally attached to the cover of the camera.
Figure 8:
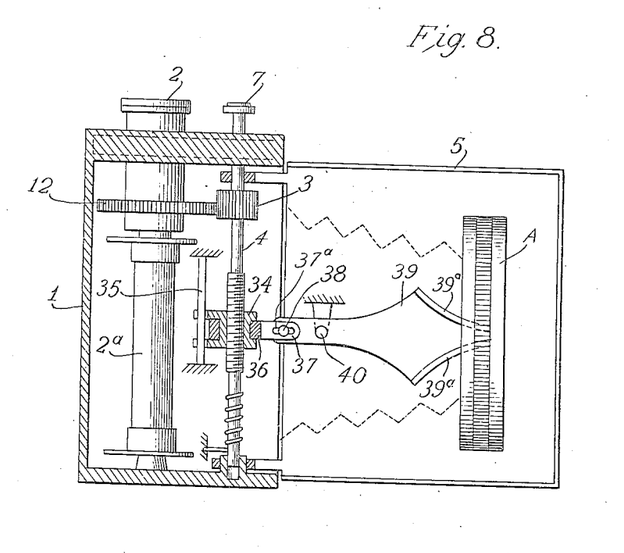
Fig. 8 illustrates a modification in which the lever controlled by the shutter operating rod is coupled with a rotatable ring on the photographic objective mount, which ring is used for effecting a tensioning and a release of the shutter combined with the photographic objective.

Fig. 7 illustrates an embodiment in which a one-piece lever arm 29 is used for tensioning and releasing the shutter. The lever arm 29 is pivotally mounted between its ends on a pin 30 attached to the cover 5. The end of the lever 29 which projects into the camera casing 1 carries a pin 31 engaging an annular groove of the sleeve 32 which is in threaded engagement with the shutter operating rod 4. The sleeve 32, in similar manner as the sleeve 8 (Fig. 1) is prevented from rotating by a stationary guide 33. When the film winding knob 2 is rotated to wind an exposed section of the film upon the take-up spool 2ª, the shutter operating rod 4 is simultaneously rotated by the gearing 3, 12 resulting in an upward movement of the threaded sleeve 27 and in a swinging movement of the lever arm 29 about its pivot pin 30, thereby effecting an actuation of the shutter tensioning lever 22. A subsequent depression of the knob 7 on the rod 4 causes a movement of the threaded sleeve 33 and the lever arm 29 in the opposite direction, thereby actuating the shutter release lever 23.

In the embodiment of the invention illustrated by the Figs. 8 to 11, the shutter operating rod 4, which also forms the pivot axis of the cover 5, is provided in similar manner as in Fig. 1 with an interiorly threaded sleeve 34 provided with an annular groove rotatably receiving a ring 36. The sleeve 34 is prevented from rotating by a stationary guide 35. The ring 36 has a short radial arm 37 provided with an oblong aperture 37ª. A lever arm 39 is pivotally mounted between its ends about a pin 40 on the cover 5 and one of its ends carries a pin 38 engaging the oblong aperture 37ª in the radial arm 37. The other end of the lever arm 39 which is directed toward the photographic objective and the shutter is provided with lateral flanges 39ª (Figs. 10 and 11) which gradually approach each other, so as to form a narrow throat at its extreme outer end. The throat is adapted to receive a radial pin 41 on a ring 42 which is rotatably mounted on the mount A which contains the photographic objective and the shutter. The ring 42 has thereon an arc-shaped projection 43, one end of which is adapted to engage and actuate the shutter tensioning lever 22, while the other end is adapted to engage and actuate the shutter release lever 23. The flanges 39ª engage alternately opposite sides of the pin 41 to cause a rotative movement of the ring 42 in opposite direction when the film winding knob 2 and the shutter release knob 7 are actuated respectively. The throat formed between the flanges 39ª of the lever arm 39 widens toward its pivot axis for the reason to insure an entrance of the pin 41 between the flanges 39 when the cover 5 is opened, even though the shutter may not have been completely wound up or tensioned.

Figure 9:
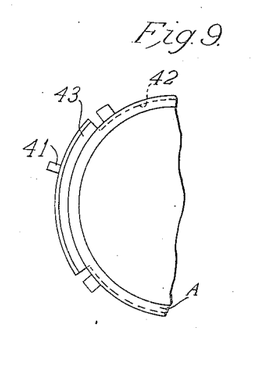
Fig. 9 is a partial front view of the camera objective of the modification illustrated in Fig. 8 and illustrates the arrangement of the rotatable ring.
Figure 10:
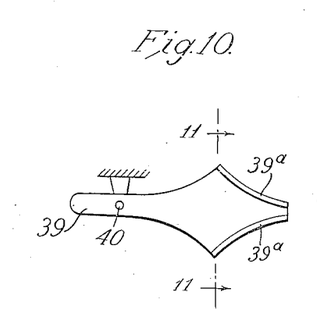
Fig. 10 is a plan view of the lever which is coupled with the rotatable ring.
Figure 11:
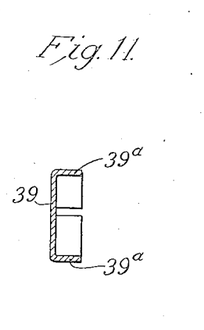
Fig. 11 is a cross sectional view of the lever along the line XI—XI of Fig. 10.
Figure 12:
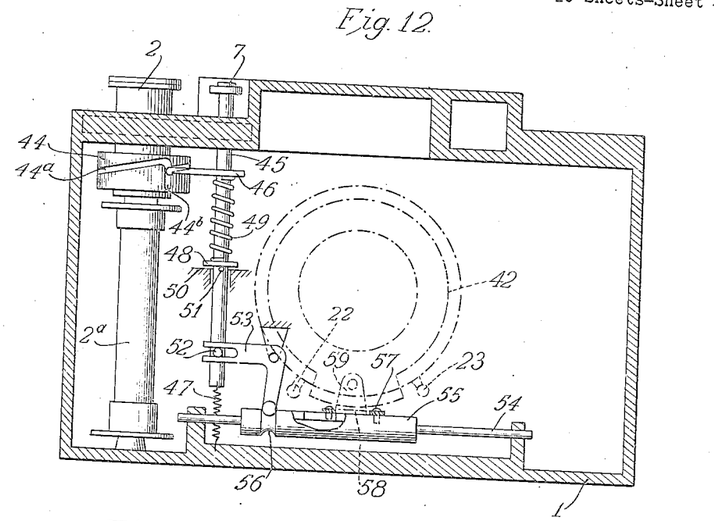
Fig. 12 is a sectional view through the camera casing of another camera taken at a right angle to the axis of the photographic objective, the coupling between the film winding device and the shutter control rod comprises a grooved disc engaging a control pin.
Figure 13:
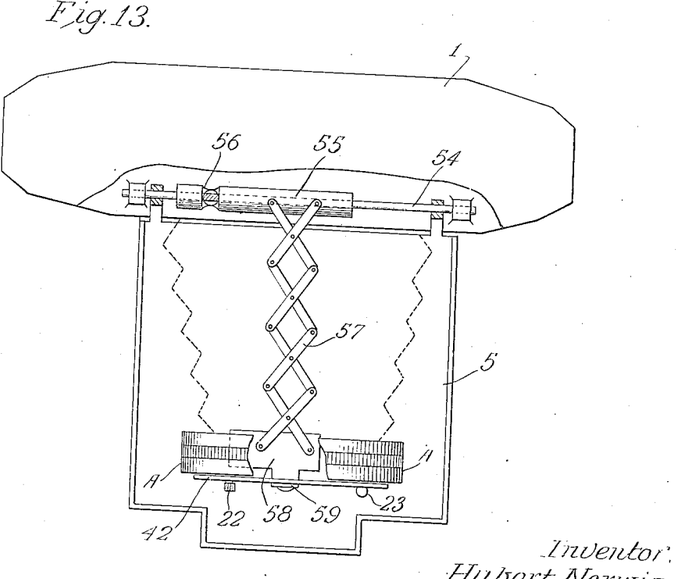
Fig. 13 is a diagrammatic plan view of the camera illustrated in Fig. 12.

In the embodiment illustrated by the Figs. 12 and 13 the gear connection 3, 12 is substituted by a cam groove connection and the cover 5 is pivoted about an axis extending at a right angle to the axis of the take-up spool 2ª. As shown in Fig. 12, the stem of the film winding knob 2 has fixedly attached thereto a cylindrical disc 44 having a cam groove 44ª in its circumferential surface. A pin 46 fixedly attached to an axially slidable rod 45 projects into the cam groove 44ª, which has such a shape, that after each advancement of the film about one picture frame the pin 46 will occupy an axially extending portion 44ᵇ of the cam groove 44ª. In this position the rod 45 which has been raised by the cam groove 44ª is returned to its initial position (shown in Fig. 12) by a spring 47. The outer end of the rod 45 is provided with the shutter release knob 7. A compression spring 49 is mounted on the rod 45 between the pin 46 and a disc 48 resting loosely against a cross pin 51. The spring 49 is stronger than the spring 47, so that the disc 48 is urged against a stationary abutment 50 in the camera casing 1. The axial movement of the rod 45 is transmitted by a bell-crank lever 53 to a sleeve 55 which is slidably mounted on a pin 54 forming the pivot axis of the cover 5. One end of the bell crank lever 53 is bifurcated and engages a cross pin 52 on the rod 45. The other end of the bell crank lever 53 engages an annular groove 56 of the sleeve 55. A lazy tongs structure 57 is attached with one end to the sleeve 55 and with the other end to a plate 58 having an upwardly bent flange 59 which is attached to the arc-shaped projection 43 of the ring 42 which, as shown in Fig. 9, is rotatably mounted on the mount A containing the photographic objective and the shutter.

Assuming that the shutter has been released, the locking device, as illustrated in Fig. 5, will be in a position in which the film winding knob 2 can be rotated to wind up the exposed section of the film. When the knob 2 is rotated the pin 46 is raised by the cam groove 44ª, thereby moving the rod 45 upwardly and rotating the bell crank lever 57 in clockwise direction. The sleeve 55 including the lazy tong structure 57 is moved toward the left, thereby rotating the ring 42 clockwise until the shutter tensioning lever 22 has been actuated. At this point the pin 46 has reached the axially extending portion 44ᵇ of the cam groove 44ª and the spring 47 returns the rod 45, and therewith the sleeve 55 and the lazy tongs structure 57 to their initial position as shown in Figs. 12 and 13. Now the shutter release knob 7 can be pushed downward against the action of the spring 49 to effect a movement of the bell crank lever 53, the sleeve 55 and the lazy tongs structure 57 in the opposite direction, so as to actuate the shutter release lever 23. Upon release of the knob 7 the spring 49 returns the rod 45, the bell crank lever 53 and the lazy tongs structure 58 to the normal position shown in Figs. 12 and 13.

Figure 14:
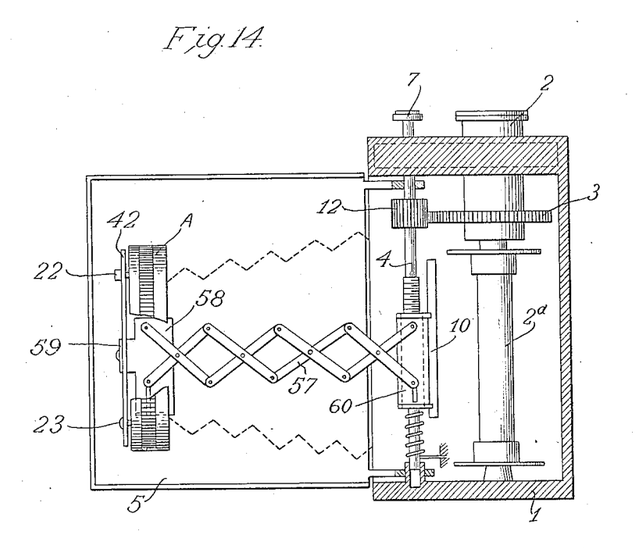
Fig. 14 illustrates in a view similar to Fig. 6 another modification of a camera, in which a rotatable shutter control ring on the photographic objective mount is connected by a lazy tongs structure with the shutter control rod.
Figure 15:
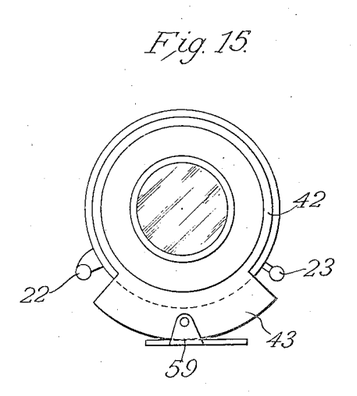
Fig. 15 is a front view of the photographic objective of the camera of Fig. 14 and illustrates the connection of the lazy tongs structure with the shutter control ring on the objective mount.
Figure 16:
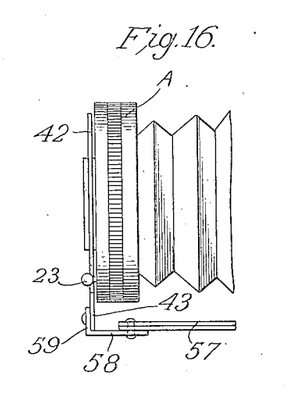
Fig. 16 is a side elevation view of the front portion of the camera of Fig. 14.

The modification of the invention as illustrated by the Figs. 14 to 16 differs principally from the embodiment just described with reference to the Figs. 12 and 13 by the employment of the shutter control rod 4 as pivot axis for the cover 5 of the camera. The shutter control rod 4, in the same manner as in Figs. 1 to 5, is connected by a gearing 3, 12 (Fig. 4) with the film winding device 2 and is rotated by the latter whenever a section of exposed film is wound upon the take-up spool 2ª. Such a rotation of the rod 4 moves the interiorly threaded sleeve 60 on the upwardly on the rod 4 to tension the shutter (Fig. 14). The stationary guide 10 prevents a rotation of the sleeve 60. The threaded sleeve 60 has one end of the lazy tongs structure 57 attached thereto, while the other end of the same is connected to the rotatable ring 42 on the mount A in the same manner as shown in the Figs. 12 and 13. The operation of this modified embodiment is believed to be obvious in view of the previously described embodiments.

Figure 17:
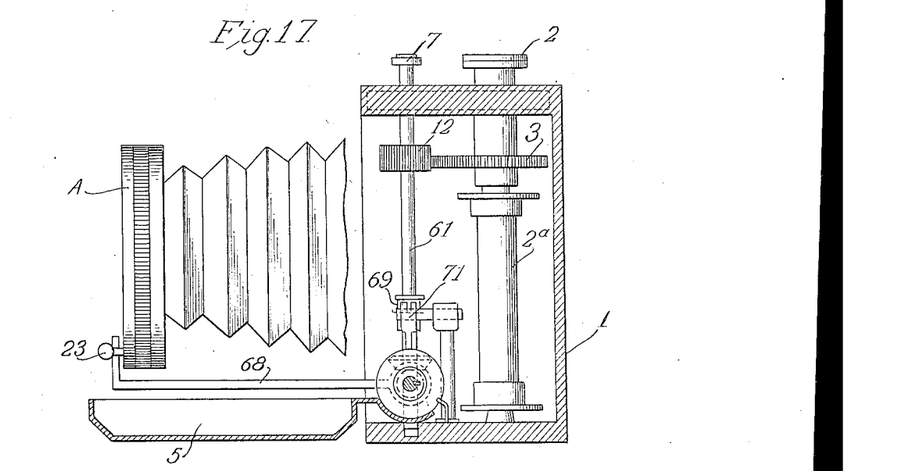
Fig. 17 is a side elevation view, partly in section of another modification of the camera, in which the shutter control rod is arranged at a right angle to the pivot axis of the cover of the camera.
Figures 18, 19:
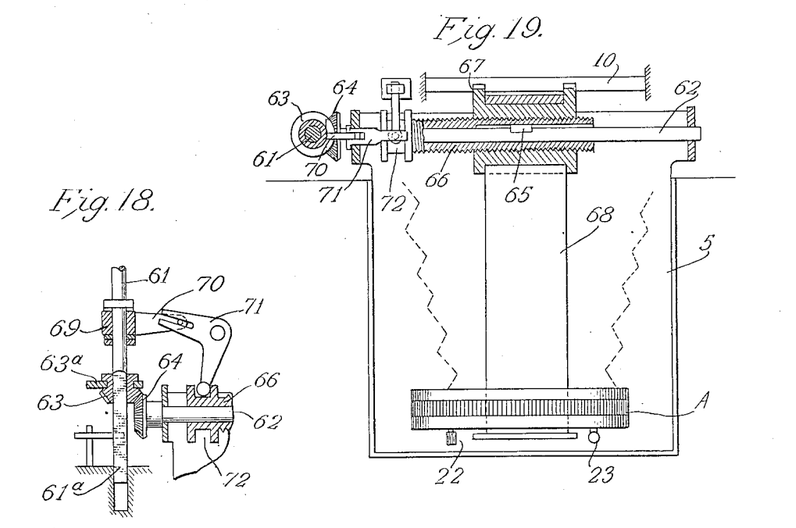
Fig. 18 illustrates in an enlarged view the mechanical connection between the shutter control rod and the lever which transmits the movement of said rod to the shutter in the camera of Fig. 17.
Fig. 19 illustrates diagrammatically a sectional view of the camera of Fig. 17 in the plane of the pivot axis of the cover and viewed from above.

The Figs. 17 to 19 illustrate an embodiment of the invention in which the rotatable and axially shiftable shutter control rod 61 and the axis of the take-up spool 2ª are arranged at a right angle with respect to the pivot shaft 62 of the cover 5 of the camera. A bevel gearing 63, 64 connects the shutter control rod 61 drivingly with the pivot shaft 62 (Fig. 18). The bevel gear 63 is rotatably journaled in a bearing 63ª of the camera casing and thus is prevented from moving in axial direction. The lower end 61ª of the shutter control rod 61 is square in cross section and extends slidably through a corresponding square bore of the bevel gear 63. The pivot shaft 62 supports slidably an exteriorly threaded sleeve 66, which by means of a key 65 is drivingly connected with the shaft 62. The sleeve 66 in turn supports an interiorly threaded bushing 67, which is prevented from rotating by the stationary guide 10. A lever arm 68 is pivotally mounted with one end on said bushing 67, while the other end of the lever arm 68 extends forwardly to the mount A containing the photographic objective and the shutter, so as to be able to actuate alternately the shutter tensioning lever 22 and shutter release lever 23.

The shutter control rod 61 carries a bushing 69 provided with an outwardly extending arm 70 engaging one leg of a bell crank lever 71, whose other leg engages an annular groove 72 near one end of the exteriorly threaded sleeve 66. When the knob 7 on the upper end of the rod 61 is manually depressed, the sleeve 66 and the bushing 67 thereon is moved toward the right, so that the lever arm 68 actuates the shutter release lever 23. This actuation of the shutter release lever 23, owing to the locking device illustrated in Fig. 5, can only take place after a previous actuation of the tensioning lever 22, which is done by the lever arm 68 during the operation of the film winding device 2.

Figure 20:
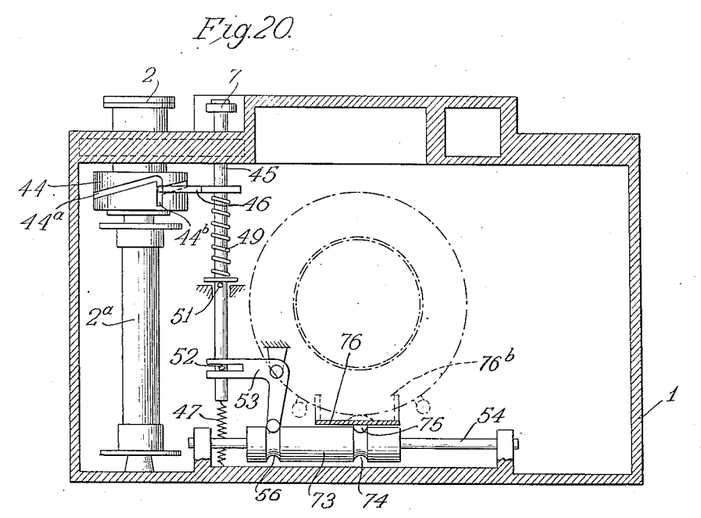
Fig. 20 illustrates in a manner similar to Fig. 12 another modification, in which the lazy tongs structure is substituted by an angular lever.
Figure 21:
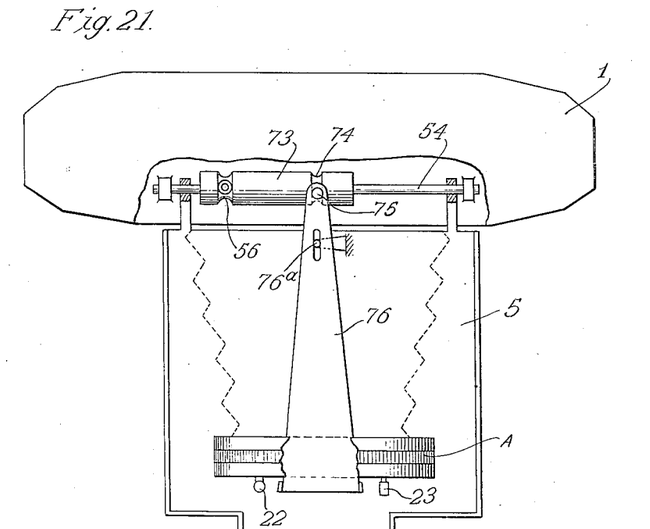
Fig. 21 shows diagrammatically a plan view of the camera of Fig. 20.

The Figs. 20 and 21 illustrate a modification of the embodiment of Fig. 12, in that the lazy tongs structure is substituted by a single lever 76. This single lever 76 is pivotally attached between its ends at 76ª to the cover 5 of the camera. One end of the lever 76 has a pin 75 engaging an annular groove 74 in a sleeve 73 axially movable on the hinge rod 54. The axial movement of the sleeve 73 is controlled, in the same manner as in Fig. 12, by a bell crank lever 53, one leg of which engages an annular groove 56 of the sleeve 73. The other end of the lever 76 terminates in an upwardly bent portion 76ᵇ adapted to alternately engage the shutter tensioning lever 22 and the shutter release lever 23.

Figure 22:
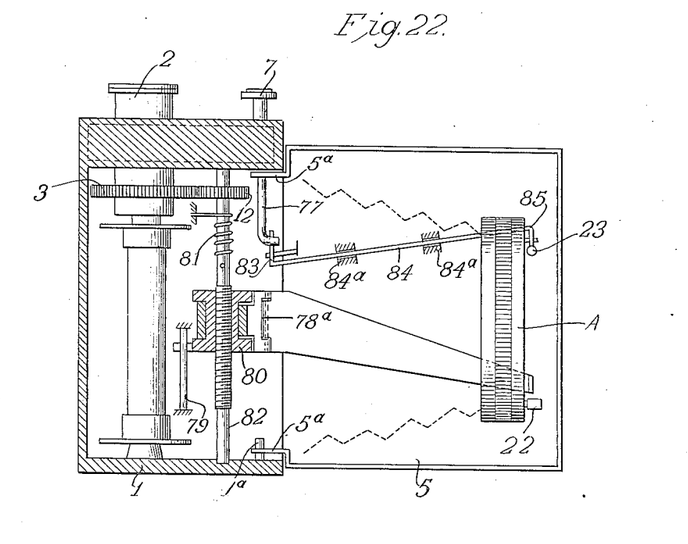
Fig. 22 illustrates in a manner similar to Fig. 6 a modification, in which the shutter tensioning device and the shutter release device are separated from each other.

According to Fig. 22 the shutter release knob 7 is mounted on a rod 77, which is coaxial with the pivot axis of the cover 5 of the camera and forms one bearing of one of the two bearing arms 5ª of the cover 5. The other arm 5ª is mounted on a separate bearing pin 1ª attached to the camera casing 1. The inner end of the rod 77 engages an angularly bent end 83 of a shaft 84 rotatably mounted in bearings 84ª on the inside of the cover 5. The other end 85 of the shaft 84 is also bent angularly with respect to the axis of the shaft and lies adjacent the shutter release lever 23 to actuate the same when the release knob 7 on the camera casing 1 is depressed.

The shutter tensioning lever 22 is actuated by a lever arm 78 which consists of two parts hingedly connected with each other at 78ª in the pivot axis of the cover 5. The short part of the lever arm 78 is rotatably attached to a sleeve 80, which is in threaded engagement with a shaft 82 arranged parallel to the pivot axis of the cover 5. A stationary guide 79 prevents a rotation of the sleeve 80 on the shaft 82. A torsion spring 81, which surrounds the shaft 82, returns the same to initial position (Fig. 22) after each actuation of the tensioning lever 22. This return movement takes place as soon as the gear 12 enters the recess 3ª in the gear 3.

Figure 23:
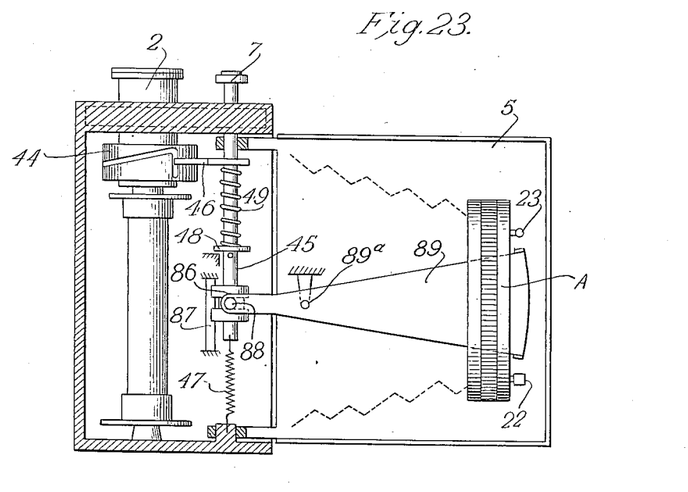
Fig. 23 illustrates still another modification of a camera of the invention.

In the embodiment shown in Fig. 23 the film winding device 2 is drivingly connected with the shutter control rod 45 by a cam drive 44, 46 in the same manner as in Figs. 12 and 20. However, the shutter control rod 45 is arranged in a different manner, namely directly in the pivot axis of the cover 5 of the camera. A sleeve 86, which is prevented from rotating by a stationary guide 87, is slidably mounted on the rod 45 and has an annular groove engaging a pin 88 on one end of a lever arm 89, the other end of which is adapted to alternately actuate the shutter tensioning lever 22 and the shutter release lever 23.

The lever arm 89 is pivotally supported between its ends on the cover 5 at 89ª. When the knob 2 is rotated for winding the film upon the spool 2ª, the shutter lever 22 is actuated by the lever arm 89, and when the knob 7 on the camera casing 1 is depressed the lever arm 89 is swung in the opposite direction to actuate the shutter release lever 23.

Figure 24:
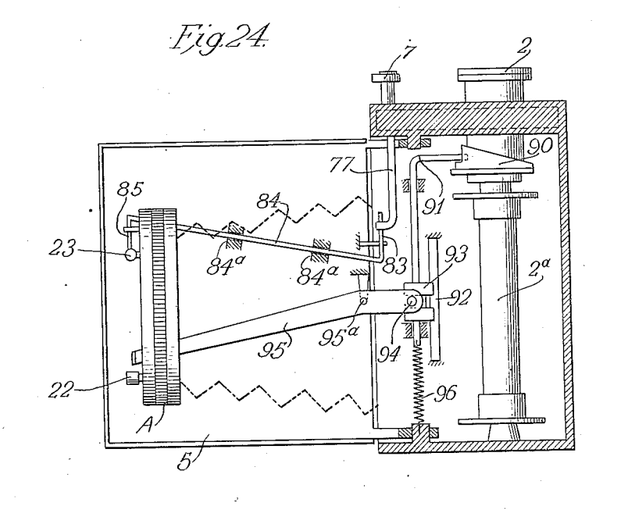
Fig. 24 illustrates another modification with separately arranged shutter tensioning and shutter release means.

The camera shown in Fig. 24 is provided with two separate means for tensioning and releasing the shutter. The shutter release device is constructed the same as illustrated in Fig. 22, except that the rod 77 is not in alinement with the pivot axis of the cover 5, but parallel thereto. Therefore, similar elements have been provided with similar reference characters. The film winding knob 2 is provided on the inner portion of its stem with a cam 90 for actuating a rectangularly bent rod 91, the long leg of which is in axial alinement with the pivot axis of the cover 5. A collar 93 on said long leg of the rod 91, which by means of a guide 92 is prevented from rotating, engages with a groove a pin 94 on one end of a lever arm 95, the other end of which is adapted to actuate the shutter tensioning lever 22. The lever arm 95 is pivotally mounted between its ends on the cover 5 at 95ª. A tension spring 96 urges the rod 91 downwardly and maintains the short leg of the latter in engagement with the cam 90. When the film winding knob 2 is rotated to wind the film upon the take-up spool 2ª, the cam 91 raises the rod 91 against the tension of the spring 96 and the lever arm 95 is oscillated to actuate the shutter tensioning lever 22.

Figure 25:
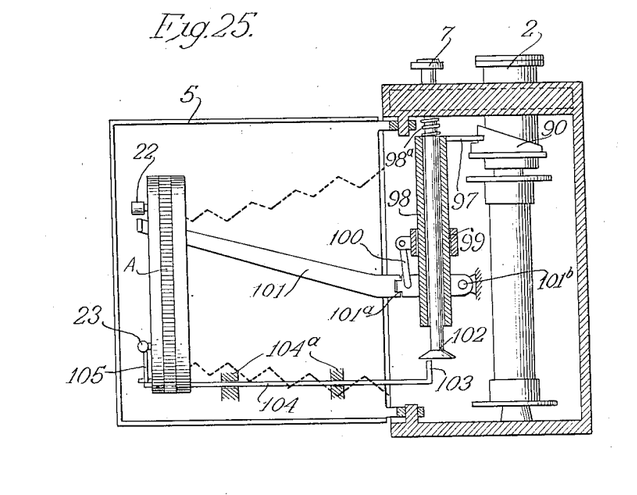
Fig. 25 illustrates a modification similar to the one shown in Fig. 24, except that the lever arm controlling the tensioning of the shutter is pivotally supported in the camera casing.

According to Fig. 25 the cam 90 on the film winding knob 2 controls the axis movement of a sleeve 98 by means of a radial pin 97 on the latter. The sleeve 98 is mounted loosely on an axially slidable rod 102, whose upper end projects from the camera casing and has the shutter control knob 7 attached thereto. A spring 98ª urges the sleeve 98 downwardly and maintains the pin 97 in engagement with the cam 90. A collar 99 attached to the sleeve 98 is connected by a link 100 with a lever arm 101 having a hinge 101ª near the pivot axis of the cover 5. One end of the lever arm 101 is pivotally supported in the camera casing at 101ᵇ and the other end is adapted to actuate the shutter tensioning lever 22. The lower end of the axially slidable rod 102 projects from the sleeve 98 and engages the angularly bent end 103 of a shaft 104 rotatably supported on the cover 5 at 104ª. The other end 105 of the shaft 104 is also bent angularly, so as to actuate the shutter release lever 23 when the knob 7 is pushed downwardly. A spring which is not shown in the drawing maintains the rod 102 normally in a raised position.

Figure 26:
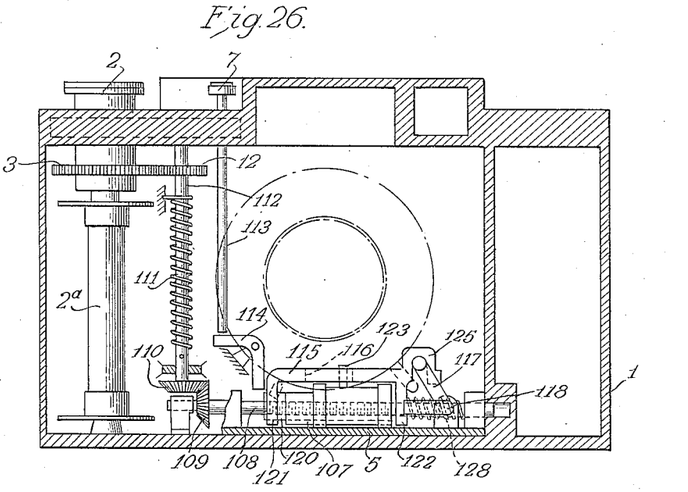
Fig. 26 illustrates in a manner similar to Fig. 12 a modification with separate control members for tensioning and releasing the shutter.
Figure 27:
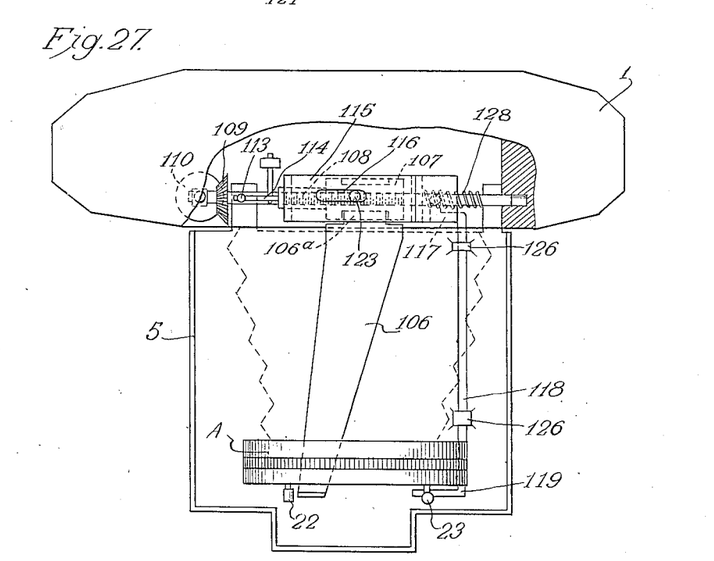
Fig. 27 is a diagrammatic plan view of the modification illustrated in Fig. 26.

The Figs. 26 and 27 illustrate another embodiment in which two separate members 106 and 118 are employed for actuating the shutter tensioning lever 22 and the shutter release lever 23 respectively. The lever arm 106 for actuating the tensioning lever 22 is rotatably mounted on a sleeve 107 having an inner thread in engagement with a corresponding outer thread on a shaft 108, whose axis is coincident with the pivot axis of the cover 5 of the camera. A bevel gearing 109, 110 connects the shaft 108 with a shaft 112, which is mounted parallel to the axis of the film take-up spool 2ª and is connected with the film winding knob 2 by the gearing 3, 12 previously described with reference to Fig. 4. A torsion spring 111 around the shaft 112 returns the latter and therewith the sleeve 107 on shaft 108 and the lever arm 106 to initial position as soon as the tensioning lever 22, at the end of each film winding operation, has been actuated. The lever arm 106 contains a hinge 106ª near the pivot axis of the cover 5, so as to permit a closing of the camera. The shutter release knob 7 on the camera casing 1 actuates a slidably mounted rod 113, which in turn by means of a bell crank lever 114 actuates a yoke 115, one end 121 of which is slidably supported by a reduced portion 120 of the sleeve 107 while its other end 122 is slidably supported by a smooth portion of the shaft 108. A pin 123 projects upwardly from the portion of the lever arm 106 encircling the sleeve 107 and projects through an axially extending slot 116 in the yoke 115. The end 122 of the yoke 115 is integrally formed with a hook-like portion 125 engaging an angularly bent end portion 117 of a shaft 118, which is rotatably supported in bearings 126 on the inside of the cover 5. The other end 119 of the shaft 118 is likewise bent angularly and terminates adjacent the shutter release lever 23 to actuate the same when the knob 7 is depressed. A spring 128 urges the yoke 115 normally toward the left and returns the yoke 115 including the rod 113 to normal position after each actuation of the shutter release lever 123. When the film winding knob 2 is rotated, the gearing 3, 12 rotates the shaft 112, which in turn rotates the threaded shaft 108. The threaded sleeve 107, which is preventing from rotating, is moved toward the left and thereby the lever arm 106 actuates the shutter tensioning lever 22.

What I claim is:

1. In a rollfilm camera, a camera casing having a hinged cover which supports in its open position the photographic objective and the shutter in operative position, a shutter tensioning member and a shutter release member on said shutter, means in said camera for winding the film upon a take-up spool, a plurality of movably interconnected rigid elements operatively connected with said film winding means for actuating in the operative position of said objective and shutter the tensioning member of the latter when said film winding device is operated, said interconnected elements including one element moving parallel to the axis of said take-up spool, and a second element extending lengthwise of said cover and terminating with one end adjacent said shutter tensioning member, said second element having lateral rigidity and being collapsible with said cover, and manually operable shutter control means on said camera casing adapted to actuate the shutter release member on said shutter.

2. In a rollfilm camera, a camera casing having a hinged cover which supports in its open position the photographic objective and the shutter in operative position, a shutter tensioning member and a shutter release member on said shutter, means in said camera for winding the film upon a take-up spool, a plurality of movably interconnected rigid elements operatively connected with said film winding means for actuating in the operative position of said objective and shutter the tensioning member of the latter when said film winding device is operated, said interconnected elements including one element moving parallel to the axis of said take-up spool, and manually operable shutter control means on said camera casing adapted to actuate the shutter release member on said shutter, said manually operable shutter control means including an axially shiftable rod within the camera, means for operating said rod from the outside of the camera casing, a member extending lengthwise of said cover and terminating with one end adjacent said shutter release member, said lengthwise extending member having lateral rigidity and being collapsible with said cover, and means operatively connecting said rod with said lengthwise extending member for actuating the latter to engage and operate said shutter release member when said shiftable rod is shifted by manually depressing said outside operating means.

3. In a rollfilm camera, a camera casing having a hinged cover which supports in its open position the photographic objective and the shutter in operative position, a shutter tensioning member and a shutter release member on said shutter, means in said camera for winding the film upon a take-up spool, means operatively connected with said film winding means for actuating in the operative position of said objective and shutter the tensioning member of the latter when said film winding device is operated, and manually operable shutter control means on said camera casing adapted to actuate the shutter release member on said shutter, said manually operable shutter control means including an axially shiftable rod within the camera casing, and coincident with the pivot axis of said hinged cover, means for operating said rod from the outside of the camera casing, a member extending lengthwise of said cover and terminating with one end adjacent said shutter release member, said lengthwise extending member having lateral rigidity and being collapsible with said cover, and means operatively connecting said rod with said lengthwise extending member for actuating the latter to engage and operate said shutter release member when said shiftable rod is shifted by manually depressing said outside operating means.

4. In a rollfilm camera, a camera casing having a hinged cover which supports in its open position the photographic objective and the shutter in operative position, a shutter tensioning member and a shutter release member on said shutter, manually rotatable means for advancing and winding the film, means for actuating said shutter tensioning member when said film advancing and winding means is operated, said actuating means including a rod mounted rotatably and axially shiftable within said camera casing, a gearing connecting said manually rotatable means with said rod for rotating the latter, said rod being provided with a thread engaging an interiorly threaded sleeve, means for preventing a rotative movement of said sleeve, a lever collapsible with said cover connected with said sleeve and terminating with one end adjacent said shutter tensioning member and said shutter release member, said sleeve upon rotation of said rod by said gearing being moved axially along said rod and thereby causing said lever to actuate said shutter tensioning member, and a manually operable member on said camera casing for axially shifting said rod in a direction in which the lever connected with the sleeve on said rod is caused to actuate said shutter release member.

5. A rollfilm camera as claimed in claim 4, in which the axis of said rotatable, axially shiftable rod is coincident with the pivot axis of said cover, and in which the lever connected with said sleeve on said rod is pivotally supported on said cover.

6. In a rollfilm camera, a camera casing having a hinged cover which supports in its open position the photographic objective and the shutter in operative position, a shutter tensioning member, a shutter release member and a rotatable ring on said shutter, said ring having a projection adapted to actuate said tensioning member and said release member, manually rotatable means for advancing and winding the film, means for actuating said shutter tensioning member when said film advancing and winding means is operated, said actuating means including a rod mounted rotatably and axially shiftable within said camera casing, a gearing connecting said manually rotatable means with said rod for rotating the latter, said rod being provided with a thread engaging an interiorly threaded sleeve, means for preventing a rotative movement of said sleeve, a lazy tongs structure collapsible with said cover connected with one of its ends to said sleeve and with its other end to said rotative ring on said shutter, said sleeve upon rotation of said rod by said gearing being moved axially along said rod and thereby causing said lazy tongs structure to rotate said ring, so that the projection on the latter actuates said shutter tensioning lever, and a manually operable member on said camera casing for axially shifting said rod in a direction in which said lazy tongs structure is caused to rotate the said ring in a direction in which the projection on the latter actuates said shutter release member.

7. In a rollfilm camera, a camera casing having a hinged cover which supports in its open position the photographic objective and the shutter in operative position, a shutter tensioning member, and a shutter release member on said shutter, manually rotatable means for advancing and winding the film, means for actuating said shutter tensioning member when said film advancing and winding means is operated, said actuating means, including a rod mounted axially shiftable within said camera casing parallel to the axis of said manually rotatable winding means, a cam disc connection between said manually rotatable winding means and said rod for shifting the latter axially when said winding means is operated, a hinge pin for connecting said cover to said camera casing and arranged at a right angle with respect to said axially shiftable rod, a sleeve slidably mounted on said hinge pin, means operatively connecting said rod with said sleeve for transmitting the axial movement of the former to the latter, means having lateral rigidity and being collapsible with said cover connected to said sleeve and extending substantially parallel to said cover toward said shutter and terminating adjacent said tensioning lever and said release lever, whereby upon operation of said manually rotatable winding means said rod and sleeve are shifted axially in one direction to cause an actuation of said shutter tensioning member, said cam drive connection permitting an independent axially shifting of said rod at the end of the advancement of a complete picture frame of the film, and a manually operable member on said camera casing for axially shifting said rod in a direction opposite to the one the said cam drive shifts the rod, for causing said means connected with said sleeve to actuate said shutter release member.

8. In a rollfilm camera, a camera casing having a hinged cover which supports in its open position the photographic objective and the shutter in operative position, a shutter tensioning member, a shutter release member and a rotatable ring on said shutter, said ring having a projection adapted to actuate said tensioning member and said release member, manually rotatable means for advancing and winding the film, means for actuating said shutter tensioning member when said film advancing and winding means is operated, said actuating means including a rod mounted axially shiftable within said camera casing parallel to the axis of said manually rotatable winding means, a cam drive connection between said manually rotatable winding means and said rod for shifting the latter axially when said winding means is operated, a hinge pin for connecting said cover to said camera casing and arranged at a right angle with respect to said axially shiftable rod, a sleeve slidably mounted on said hinge pin, means operatively connecting said rod with said sleeve for transmitting the axial movement of the former to the latter, a lazy tongs structure collapsible with said cover connected with one of its ends to said sleeve and with its other end to the projection of said rotatable ring on said shutter, whereby upon rotation of said manually rotatable winding means said rod and sleeve are shifted axially in one direction to cause an actuation of said shutter tensioning member, said cam drive connection permitting an independent axially shifting of said rod at the end of the advancement of a complete picture frame of the film, and a manually operable member on said camera casing for axially shifting said rod in a direction opposite to the one the said cam drive shifts the rod for causing said lazy tongs structure connected with said sleeve to actuate said shutter release member.

9. In a rollfilm camera, a camera casing having a hinged cover which supports in its open position the photographic objective and the shutter in operative position, a shutter tensioning member, a shutter release member and a rotatable ring on said shutter, said ring having a projection adapted to actuate said tensioning member and said release member, manually rotatable means for advancing and winding the film, means for actuating said shutter tensioning member when said film advancing and winding means is operated, said actuating means including a rod mounted rotatably and axially shiftable within said camera casing, a gearing connecting said manually rotatable means with said rod for rotating the latter, said rod being provided with a thread engaging an interiorly threaded sleeve, means for preventing a rotative movement of said sleeve, a lever collapsible with said cover pivotally connected with one of its ends to said sleeve and rotatably mounted between its ends on said cover, the other end of said lever terminating adjacent said rotatable ring and being provided with two laterally extending marginal flanges forming a gradually converging throat for the reception of a portion of said projection on said rotatable ring, said sleeve upon rotation of said rod by said gearing being moved axially along said rod and thereby causing said lever to rotate said ring in one direction to actuate said shutter tensioning lever, and a manually operable member on said camera casing for axially shifting said rod in a direction in which the lever controlled by said sleeve rotates said ring in the opposite direction to actuate said shutter release member.

10. In a rollfilm camera, a camera casing having a hinged cover which supports in its open position the photographic objective and the shutter in operative position, a shutter tensioning member on said shutter, means in said camera casing for winding the film upon a take-up spool, and means operatively connected with said film winding means for actuating in the operative position of said objective and shutter the tensioning member of the latter, said means including a linearly movable member mounted within the camera casing along the axis of the hinge connecting said cover to said camera casing, a mechanical connection between said member and said film winding means for converting the rotative movement of the latter into a linear movement of said member, a longitudinal member extending substantially at a right angle to said hinge axis from said linearly movable member toward said shutter and terminating adjacent said shutter tensioning member, said longitudinal member having lateral rigidity and being collapsible with said cover and being actuated by said linearly movable member when said film winding means is operated to actuate said shutter tensioning member.

11. A rollfilm camera as claimed in claim 4, in which the gearing between said manually rotatable means and said rotatable, axially shiftable rod including a gear driven by said manually rotatable means and provided with a circumferential recess, and a second gear fixedly secured on said rotatable axially shiftable shaft, said first named gear engaging said second gear when said manually rotatable means is actuated to advance the film, the recess in said first named gear causing a disengagement between said two gears after the film has been advanced one picture length and the shutter has been tensioned by said lever, and spring means connected with said rotatable axially shiftable rod for returning the same to its initial position when said two gears are disengaged from each other.

HUBERT NERWIN.